(12) United States Patent
Thompson et al.

(10) Patent No.: US 12,532,867 B2
(45) Date of Patent: Jan. 27, 2026

(54) ONE-HANDED LEASH WITH QUICK-RELEASE MECHANISM

(71) Applicants: Jacob Thompson, Princeville, IL (US); Trey Thompson, Navarre, FL (US)

(72) Inventors: Jacob Thompson, Princeville, IL (US); Trey Thompson, Navarre, FL (US)

( * ) Notice: Subject to any disclaimer, the term of this patent is extended or adjusted under 35 U.S.C. 154(b) by 0 days.

(21) Appl. No.: 18/815,831

(22) Filed: Aug. 26, 2024

(65) Prior Publication Data
US 2025/0064023 A1 Feb. 27, 2025

Related U.S. Application Data

(60) Provisional application No. 63/534,651, filed on Aug. 25, 2023.

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC ............................ A01K 27/003; A01K 27/005
See application file for complete search history.

(56) References Cited

U.S. PATENT DOCUMENTS

| | | | | |
|---|---|---|---|---|
| 2,821,169 A | * | 1/1958 | Barhorst | A01K 27/005 119/776 |
| 3,099,250 A | * | 7/1963 | Soles, Jr. | A01K 27/005 D30/153 |
| 3,505,979 A | * | 4/1970 | Rosswag | A01K 15/021 119/772 |
| 4,149,492 A | * | 4/1979 | Kovacs | A01K 27/005 119/774 |
| 4,530,310 A | * | 7/1985 | Clarke | A01K 27/005 463/47.4 |
| 4,903,638 A | * | 2/1990 | Lacey | F16B 45/021 119/776 |

(Continued)

FOREIGN PATENT DOCUMENTS

| CN | 214339371 U | 10/2021 |
|---|---|---|
| CN | 115720859 A | 3/2023 |

(Continued)

*Primary Examiner* — Kimberly S Berona
*Assistant Examiner* — Katherine June Walter
(74) *Attorney, Agent, or Firm* — BEKIARES ELIEZER LLP

(57) ABSTRACT

The present invention relates to a one-handed leash with a unique quick-release mechanism. The leash may include a handle, a trigger assembly located on the handle, a cable system running through the interior of a leash body, and a releasable collar attachment mechanism at the end of the leash body. The trigger assembly, when activated, manipulates the cable system to release or reattach to a collar, enabling the user to control the leash with one hand. The leash may also include additional features depending on the configuration of the system. The invention provides a significant improvement over traditional leashes, offering ease of use, durability, and versatility, making it suitable for various applications including law enforcement, military, and recreational activities. The invention also includes a method for making and using the disclosed leashes.

19 Claims, 6 Drawing Sheets

(56) References Cited

U.S. PATENT DOCUMENTS

| | | | | |
|---|---|---|---|---|
| 5,103,771 | A * | 4/1992 | Lee | A01K 27/005 119/776 |
| 6,230,663 | B1 * | 5/2001 | Welch | A01K 27/005 119/776 |
| 6,374,779 | B1 * | 4/2002 | Miller | A01K 27/005 119/863 |
| 6,955,138 | B2 | 10/2005 | DeBien | |
| 8,336,505 | B2 | 12/2012 | Lopusnak et al. | |
| 8,826,865 | B2 | 9/2014 | Bogdahn et al. | |
| 2003/0145801 | A1 * | 8/2003 | DeBien | A01K 27/005 119/772 |
| 2005/0241596 | A1 | 11/2005 | Deverall | |
| 2010/0319631 | A1 | 12/2010 | Rane | |
| 2011/0023794 | A1 | 2/2011 | Smith | |
| 2018/0177157 | A1 | 6/2018 | Butler, III | |
| 2020/0359604 | A1 * | 11/2020 | Soto | A01K 27/001 |
| 2021/0274475 | A1 | 9/2021 | Altman | |

FOREIGN PATENT DOCUMENTS

| | | |
|---|---|---|
| DE | 3943122 A1 | 7/1991 |
| DE | 202007008699 U1 | 11/2007 |
| DE | 202008011889 U1 | 11/2008 |
| EP | 1025752 A1 | 8/2000 |
| FR | 2348649 A1 | 11/1977 |

* cited by examiner

ONE-HANDED LEASH WITH QUICK-RELEASE MECHANISM

RELATED APPLICATION

This application claims the benefit of priority to U.S. Provisional Application No. 63/534,651 filed on Aug. 25, 2023, present disclosure relates to devices, systems, and methods for leashes, for example, a one-handed leash with quick release mechanism.

FIELD OF DISCLOSURE

The present disclosure relates to devices, systems, and methods for leashes, for example, a one-handed leash with quick release mechanism.

BACKGROUND

In various situations, the need arises to quickly release a dog from its leash. This is particularly relevant in contexts such as law enforcement and military operations, where personnel may need to release their dogs swiftly to respond to evolving situations. Conventionally, quick-release mechanisms might be thought of, but in the context of working dog leashes, no such quick-release mechanism exists. Instead, conventional solutions require force on the leash to be removed before release. This existing method essentially separates the ability to retain force with the leash and the ability to release it, requiring two distinct systems to function.

Conventional leashes typically necessitate the use of multiple hands to release the leash. This may require the handler to hold the leash in the opposite weak hand position and then reach to the collar to release the clip or pull a tab with the strong hand to activate the release. These two-handed operations are not considered quick-release mechanisms. Instead, they are simply conventional dog leash clips. The conventional approach can often be problematic because the user must have two hands free for release of the dog, which may not be the case when responding to various situations. For example, a law enforcement officer may need one hand to utilize their equipment while controlling their dog. The conventional two-handed mechanism is impractical and could potentially prove to be dangerous in such scenarios.

Accordingly, conventional leashes cannot be operated with single hand for a quick release of the leash. Typically, any conventional leash either requires complex dual-system functions or two-handed operations that are not suitable for immediate, efficient release. Thus, there exists a need for a leash with a one-handed quick release mechanism. This need and other related requirements, although specific details of the invention are not elaborated in this background section.

BRIEF OVERVIEW

In one aspect, a one-handed leash with a quick-release mechanism may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In further aspects, the present disclosure relates to device and system for leashing with a trigger assembly that can allow the user to release and reattach the leash with one hand. The trigger assembly can be on the handle of the leash. The leash can connect to a cable that can run through the interior of the leash. When the trigger is pulled, the cable can be released. The cable can be released from the leash. When the cable is released, it can allow the dog to run free. The collar can be reattached to the leash using the clip. The collar can be reattached to the leash by connecting the clip to the collar connection point.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
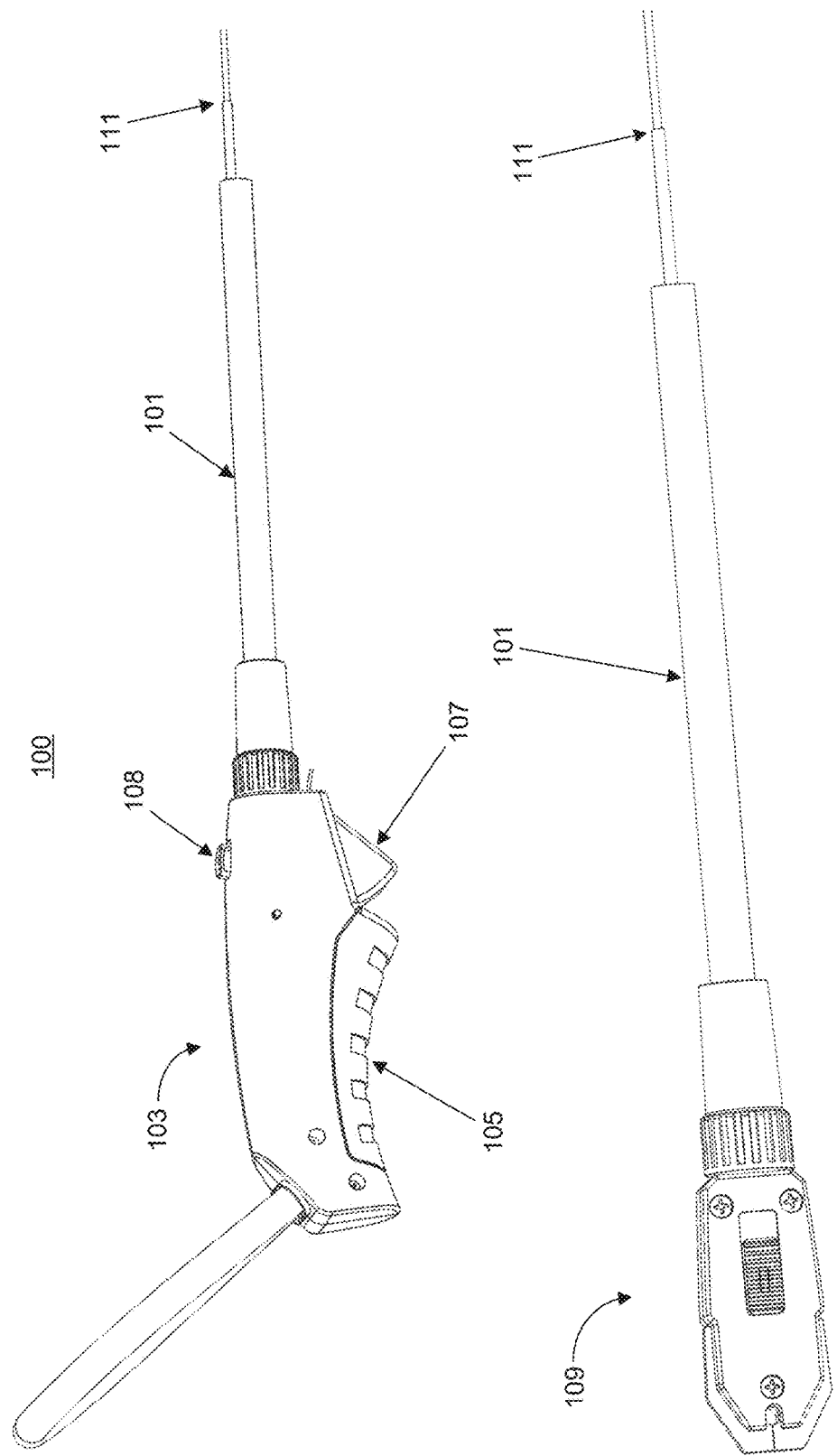
FIG. 1 shows a side view of the leash system consistent with an embodiment of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of one-handed dog leashes with quick-release mechanism of the present disclosure are not limited to use only in this context.

Platform Overview

Consistent with embodiments of the present disclosure, a One-Handed Leash with Quick-Release Mechanism may be provided. This overview is provided to introduce a selection of concepts in a simplified form that are further described below. This overview is not intended to identify key features or essential features of the claimed subject matter. Nor is this overview intended to be used to limit the claimed subject matter's scope. The One-Handed Dog Leash with Quick-Release Mechanism may be used by individuals or companies to control their dogs while maintaining the ability to perform other tasks with their free hand.

The use of trained dogs supplements many critical services. Law enforcement, military personnel, and first responders often work with dogs when responding to time-critical situations. In certain situations, the need to quickly release your dog may be critical to the outcome of the response to the situation. This could be problematic as you may need your other hand to perform other tasks, such as drawing a weapon, operating equipment, or other tasks that arise when responding to a situation.

The One-Handed Leash with Quick-Release Mechanism is designed to address this issue. The system can feature a handle. The system may comprise a trigger assembly. The trigger assembly may be located on the handle. The system may comprise a cable running through the interior of the system. The system may comprise a clip at the end of the leash. The trigger assembly can be connected to the cable. The manipulation of the trigger assembly can control the cable. In certain situations, the trigger assembly can also control at least one of the release and the reattachment of the clip. In further embodiments the clip may be configured to release the collar. In further embodiments, the clip may be integrated into the collar. The clip may be integrated into the collar such that release of the clip from the leash may also release the collar. The release of the clip may correspond to the simultaneous release of the collar. The release of the collar may be in response to release of the clip. This system can allow for quick and easy release of the cable. The system can also enable reattachment of the leash with one hand.

The handle of the leash can be designed to be comfortably gripped. The handle may provide a secure grip that is resistant to slippage. The trigger assembly can be located on the handle. The trigger mechanism can be easily accessed by the user during use. The trigger assembly can be resistant to accidental activation. The trigger assembly can ensure that the clip is not released unintentionally. In further embodiments, the clip at the end of the leash can be configured to open and/or close. In further embodiments, the length of the leash can be semi-permanently attached to a collar. The leash can be released and reattached via the clip such that the leash can be semi-permanently attached to the collar. The clip at the end of the leash can be released and/or reattached via manipulation of the cable by the trigger assembly. In further embodiments, the trigger assembly can cause the clip to open. The clip may be closed when the clip contacts the collar. The collar may comprise a collar connection point configured to close the clip. The clip may automatically close when the clip makes contact with a connection point of the collar. The clip can be designed to be easily reattached. The system can be designed to prevent accidental release.

The system can also be designed for consumer use. The system can provide a quick-release mechanism that can be operated with one hand. The quick release mechanism makes it easier and more accessible to use than traditional dog leashes. In some embodiments, the system can enable quick release of medical support animals. The trigger mechanism can be designed to reduce complexity of the actions required to release the dog. The design of the system can also ensure that the system is durable and secure than traditional dog leashes, ensuring that the user maintains control of the dog at all times.

Platform Configuration

According to various embodiments of the invention, the platform of the present disclosure can comprise multiple configurations. FIGS. 1-6 illustrate non-limiting examples of embodiments of operating environments, mechanisms, and components for the disclosed apparatuses, leashes, devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in the claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

In further aspects, the techniques described herein relate to a one-handed leash system, including: a leash body having a first end and a second end; a handle portion disposed at the first end of the leash body, the handle portion including: a grip section configured to be grasped by a user's hand, and a trigger assembly disposed on the grip section; a clip mechanism disposed at the second end of the leash body, the clip mechanism configured to releasably attach to a collar; and an interior cable extending through the leash body from the trigger assembly to the clip mechanism, wherein the interior cable is configured to transmit a release signal from the trigger assembly to the clip mechanism.

In some aspects, the trigger assembly includes a lever mechanism configured to be actuated by a user's finger while grasping the grip section. The grip section may include ergonomic finger grooves configured to facilitate one-handed operation of the trigger assembly. In other aspects, the clip mechanism may include: a housing, a movable jaw member, and a spring element biasing the movable jaw member towards a closed position. The interior cable may be operatively connected to the movable jaw member, and wherein actuation of the trigger assembly causes the interior cable to move the movable jaw member to an open position against the bias of the spring element. In some aspects, the interior cable may include a first cable segment and a second cable segment, the first and second cable segments being operatively connected to provide continuous signal transmission from the trigger assembly to the clip mechanism.

In some aspects, the quick-reattachment mechanism may be included and configured to facilitate one-handed reattachment of the clip mechanism to a dog collar. The quick-reattachment mechanism may include a magnetic element disposed on the clip mechanism. The magnetic element may be used to hold the clamp members closed or to assist in aligning and securing the clip mechanism to a complementary element on the collar. The leash body may be fabricated from a reflective material to enhance visibility in low-light conditions. An integrated light source may also be disposed on the handle portion to illuminate the path ahead during use.

In further aspects, the techniques described herein relate to a one-handed leash apparatus, including: a handle configured for gripping with one hand; an elongated leash body extending from the handle; a trigger assembly disposed on the handle; a cable disposed within the elongated leash body and operatively connected to the trigger assembly; and a clip disposed at a distal end of the elongated leash body opposite the handle, the clip being operatively connected to the cable and configured to selectively release and reattach to a dog collar in response to actuation of the trigger assembly.

In some aspects, the trigger assembly may include a lever mechanism or a button mechanism, or a combination of thereof. The handle may include ergonomic contours configured to fit a user's hand, for example, the ergonomic contours may include finger grooves. The trigger assembly may be positioned for actuation by a user's thumb when gripping the handle. The cable may include a material selected from the group consisting of nylon, Kevlar, and steel. The clip includes a spring-loaded mechanism configured to facilitate quick reattachment to a dog collar. In some aspects, the techniques described herein relate to one-handed leash apparatus, further including a safety lock mechanism configured to prevent unintended actuation of the trigger assembly.

In further aspects, the techniques described herein relate to a quick-release leash system, including: a handle portion configured for one-handed operation; a leash portion extending from the handle portion; a release mechanism integrated within the handle portion; a transmission element disposed within the leash portion and operatively connected to the release mechanism; and a collar attachment device disposed at a distal end of the leash portion, the collar attachment device being configured to selectively engage and disengage from a collar in response to actuation of the release mechanism. The release mechanism may include a trigger assembly positioned for actuation by a user's finger or thumb.

In some aspects, the techniques described herein relate to a quick-release dog leash system, wherein the transmission element includes a flexible cable. In some aspects, the collar attachment device may include a spring-loaded clip. In other aspects, the handle portion may include an ergonomic design configured to facilitate one-handed control of the leash and actuation of the release mechanism. In other aspects, the techniques described herein relate to a quick-release dog leash system, further including a reattachment mechanism configured to facilitate one-handed reattachment of the collar attachment device to a dog collar.

In further aspects, the techniques described herein relate to a leash apparatus with one-handed quick-release functionality, including: a grip portion configured for one-handed holding; an elongated flexible member extending from the grip portion; a release actuator integrated within the grip portion; a force transmission member disposed within the elongated flexible member and operatively connected to the release actuator; and a collar coupling element disposed at a distal end of the elongated flexible member, the collar coupling element being configured to selectively attach to and detach from a collar in response to manipulation of the release actuator.

In some aspects, the techniques described herein relate to a leash apparatus, wherein the release actuator includes a trigger mechanism positioned for actuation by a user's thumb or finger while gripping the grip portion. In other aspects, the techniques described herein relate to a leash apparatus, wherein the force transmission member includes a tensile element selected from the group consisting of a cable, a wire, and a cord. In some aspects, the techniques described herein relate to a leash apparatus, wherein the collar coupling element includes a biased clip mechanism configured for rapid reattachment to a collar. In some aspects, the techniques described herein relate to a leash apparatus, further including a locking mechanism configured to selectively prevent actuation of the release actuator. In some aspects, the techniques described herein relate to a leash apparatus, wherein the grip portion includes ergonomic features configured to enhance one-handed control and operation. In some aspects, the techniques described herein relate to a leash apparatus, wherein the collar coupling element is configured to automatically reattach to a dog collar upon alignment with the dog collar. In still other aspects, the techniques described herein relate to a leash apparatus, further including a tethering member disposed within the elongated flexible member and configured to tether the grip portion and the collar coupling element.

In further aspects, the techniques described herein relate to a one-handed leash system, including: a handle configured for gripping with one hand; a leash portion extending from the handle; a clip at a distal end of the leash portion, the clip configured to attach to a dog collar; a trigger assembly disposed on the handle; an interior cable system extending through the leash portion and operatively connecting the trigger assembly to the clip; and wherein activation of the trigger assembly manipulates the interior cable system to release the clip from the dog collar.

In some aspects, the techniques described herein relate to one-handed leash system, wherein the trigger assembly includes a lever mechanism. In some aspects, the techniques described herein relate to one-handed leash system, wherein the trigger assembly is positioned for actuation by a thumb of a user while gripping the handle. In some aspects, the techniques described herein relate to one-handed leash system, wherein the handle includes finger grooves configured to ergonomically fit a user's hand. In some aspects, the techniques described herein relate to one-handed leash system, wherein the clip is configured for quick reattachment to the collar after release. In some aspects, the techniques described herein relate to one-handed leash system, wherein the interior cable includes a material selected from the group consisting of nylon, Kevlar, and steel. In some aspects, the techniques described herein relate to one-handed leash system, wherein the clip includes a spring-loaded mechanism for facilitating reattachment to the dog collar. In some aspects, the techniques described herein relate to one-handed leash system, wherein the handle is formed of a material selected from the group consisting of plastic, metal, and wood. In some aspects, the techniques described herein relate to one-handed leash system, further including a light integrated into the handle. In some aspects, the techniques described herein relate to one-handed leash system, wherein the leash portion includes a reflective material.

In further aspects, the techniques described herein relate to a quick-release leash apparatus, including: an ergonomic handle having finger grooves; a leash portion extending from the handle; a quick-release mechanism integrated into the handle; a clip at a distal end of the leash portion; and a cable system operatively connecting the quick-release mechanism to the clip; wherein actuation of the quick-release mechanism causes the clip to disengage from a dog collar.

In some aspects, the techniques described herein relate to a quick-release leash apparatus, wherein the quick-release mechanism includes a thumb-actuated trigger. In some aspects, the techniques described herein relate to a quick-release leash apparatus, wherein the cable system includes a continuous cable extending from the quick-release mechanism to the clip. In some aspects, the techniques described herein relate to a quick-release leash apparatus, wherein the cable system includes two separate cables operatively connected to transmit force from the quick-release mechanism to the clip. In some aspects, the techniques described herein relate to a quick-release leash apparatus, wherein the clip includes a spring-loaded latch configured for one-handed reattachment to the dog collar. In some aspects, the techniques described herein relate to a quick-release leash apparatus, wherein the handle is configured to fit naturally in a user's hand for single-handed operation of both the leash and the quick-release mechanism.

In further aspects, the techniques described herein relate to a leash release system, including: a leash body having a proximal end and a distal end; a grip portion at the proximal end of the leash body; a release actuator integrated into the grip portion; a collar attachment mechanism at the distal end of the leash body; and a force transmission element extending through the leash body and operatively connecting the release actuator to the collar attachment mechanism; wherein activation of the release actuator causes the collar attachment mechanism to detach from a collar.

In some aspects, the techniques described herein relate to a leash release system, wherein the release actuator is positioned for operation by a thumb of a user while gripping the grip portion. In some aspects, the techniques described herein relate to a leash release system, wherein the force transmission element includes a cable selected from the group consisting of a metal cable, a polymer cable, and a composite fiber cable. In some aspects, the techniques described herein relate to a leash release system, wherein the collar attachment mechanism includes a spring-biased clip configured for rapid reattachment to the dog collar. In some aspects, the techniques described herein relate to a leash release system, wherein the grip portion includes ergonomic contours designed for single-handed control of the leash and operation of the release actuator.

In further aspects, the techniques described herein relate to a one-handed leash apparatus, including: a handle configured for gripping with one hand; an elongated leash body extending from the handle; a trigger assembly disposed on the handle; an interior cable system extending through the leash body and operatively connected to the trigger assembly; and a clip disposed at a distal end of the leash body opposite the handle, the clip configured to selectively release from and reattach to a dog collar in response to manipulation of the trigger assembly.

In some aspects, the techniques described herein relate to one-handed leash apparatus, wherein the trigger assembly includes a lever mechanism. In some aspects, the techniques described herein relate to one-handed leash apparatus, wherein the trigger assembly includes a button mechanism. In some aspects, the techniques described herein relate to one-handed leash apparatus, wherein the handle includes ergonomic finger grooves. In some aspects, the techniques described herein relate to one-handed leash apparatus, wherein the trigger assembly is positioned for actuation by a user's thumb when gripping the handle. In some aspects, the techniques described herein relate to one-handed leash apparatus, wherein the interior cable includes a continuous cable extending from the trigger assembly to the clip. In some aspects, the techniques described herein relate to one-handed leash apparatus, wherein the interior cable includes a first cable segment and a second cable segment operatively connected within the leash body. In some aspects, the techniques described herein relate to one-handed leash apparatus, wherein the clip includes a spring-loaded mechanism configured to bias the clip towards a closed position. In some aspects, the techniques described herein relate to one-handed leash apparatus, wherein the clip includes a locking mechanism configured to secure the clip in a closed position until released by actuation of the trigger assembly. In some aspects, the techniques described herein relate to one-handed leash apparatus, wherein the leash body includes a flexible material selected from the group consisting of nylon, leather, and synthetic fabric. In some aspects, the techniques described herein relate to one-handed leash apparatus, wherein the interior cable includes a material selected from the group consisting of nylon, Kevlar, and steel. In some aspects, the techniques described herein relate to one-handed leash apparatus, wherein the clip includes a material selected from the group consisting of metal and high-strength plastic. In some aspects, the techniques described herein relate to one-handed leash apparatus, further including a light source integrated into the handle. In some aspects, the techniques described herein relate to one-handed leash apparatus, further including a whistle integrated into the handle. In some aspects, the techniques described herein relate to one-handed leash apparatus, wherein the leash body includes a reflective material.

In further aspects, the techniques described herein relate to a quick-release leash system, including: a handle portion configured for one-handed operation; an elongated leash portion extending from the handle portion; a release mechanism integrated into the handle portion; a cable system extending through the leash portion and operatively connected to the release mechanism; and a collar attachment mechanism disposed at a distal end of the leash portion, the collar attachment mechanism configured to selectively engage with and disengage from a dog collar in response to actuation of the release mechanism.

In some aspects, the techniques described herein relate to a quick-release leash system, wherein the release mechanism includes a thumb-actuated trigger. In some aspects, the techniques described herein relate to a quick-release leash system, wherein the cable system includes a tension-responsive mechanism configured to transmit force from the release mechanism to the collar attachment mechanism. In some aspects, the techniques described herein relate to a quick-release leash system, wherein the collar attachment mechanism includes a spring-loaded clip. In some aspects, the techniques described herein relate to a quick-release leash system, wherein the handle portion includes ergonomic contours configured to facilitate secure gripping and trigger actuation with a single hand. In some aspects, the techniques described herein relate to a quick-release leash system, further including a reattachment feature configured to allow one-handed reconnection of the collar attachment mechanism to the dog collar. In some aspects, the techniques described herein relate to a quick-release leash system, wherein the leash portion includes a flexible, durable material resistant to tangling. In some aspects, the techniques described herein relate to a quick-release leash system, wherein the cable system is configured to operate smoothly within the leash portion to minimize friction during actuation. In other aspects, the techniques described herein relate to a quick-release leash system, wherein the collar attachment mechanism is configured to provide audible feedback upon successful engagement with or disengagement from the dog collar.

Figure 2:
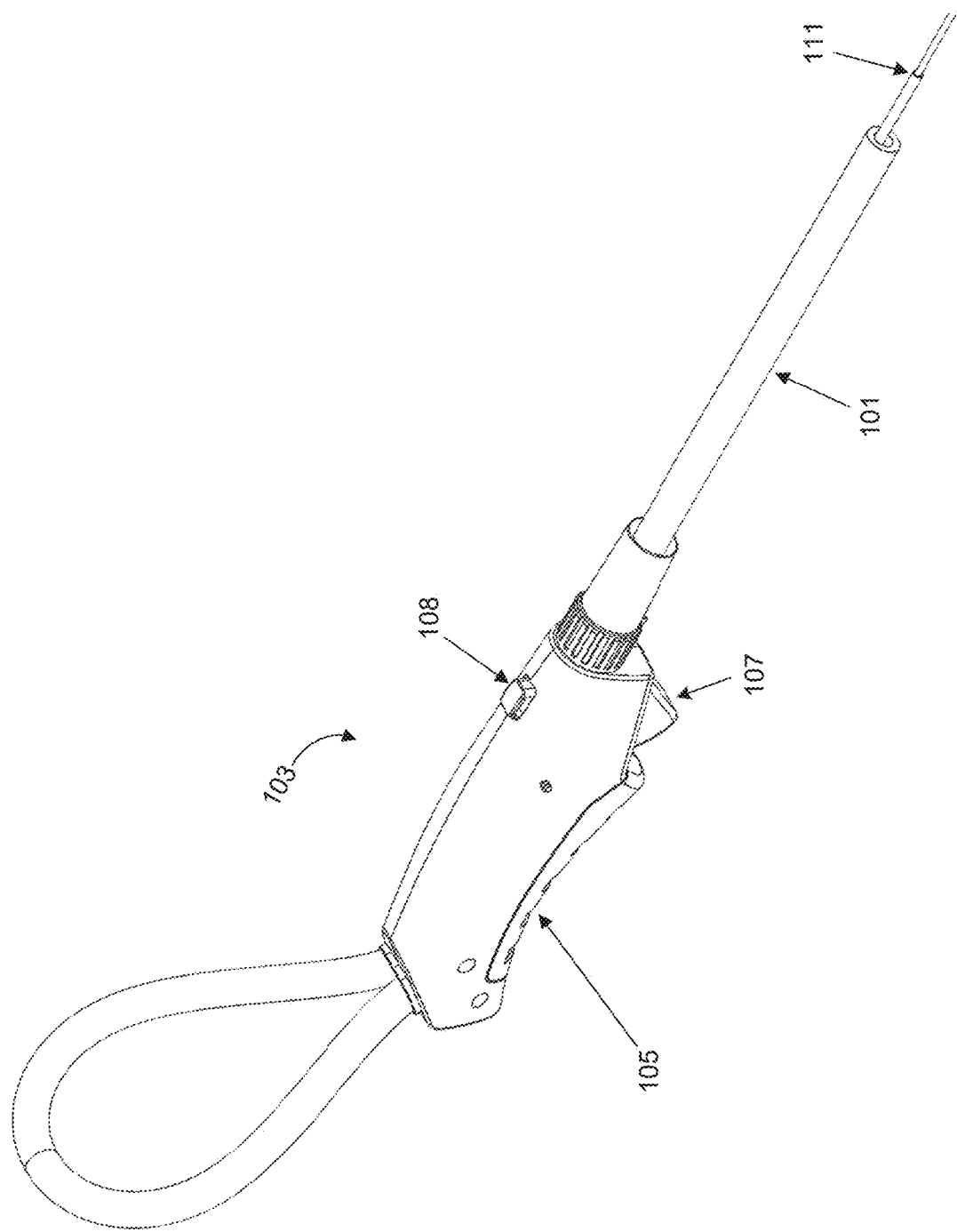
FIG. 2 is a detailed perspective view of the handle portion of the leash, showing the location and design of the trigger assembly consistent with an embodiment of the present disclosure.

In an aspect, FIG. 1 illustrates an embodiment of the one-handed leash system 100 in accordance with the present disclosure. System 100 include a leash body 101 having a first end and a second end; a handle portion 103 disposed at the first end of the leash body, the handle portion comprising: a grip section 105 configured to be grasped by a user's hand, and a trigger assembly (e.g., a release mechanism or release actuator) 107 disposed on the grip section; a clip mechanism (e.g., a collar coupling element or collar attachment device) 109 disposed at the second end of the leash body, the clip mechanism configured to releasably attach to a collar; and an interior cable 111 extending through the leash body from the trigger assembly to the clip mechanism, wherein the interior cable is configured to transmit a release signal from the trigger assembly to the clip mechanism. FIG. 2 shows another perspective of leash body 101 and handle portion 103.

In further aspects, system 100 can include a quick-release mechanism. The quick-release mechanism can allow the quick and easy release of a dog when necessary. The quick release mechanism can be integrated into the handle portion. The handle portion of the leash can be designed to be comfortably held and operated with one hand. The handle portion can be ergonomically designed to fit the natural contours of the user's hand. The handle portion can provide a secure and comfortable grip during extended periods of use.

The leash body itself can be made of a durable material that can withstand the pulling force of a dog. The leash body can be designed to be long enough to give the dog a reasonable amount of freedom. The quick release mechanism can allow the users to maintain control of the leash without unplanned release of the mechanism. The leash body can also be flexible. The leash body can be flexible such that it can allow the leash to bend and flex without damaging the quick release mechanism. The quick-release mechanism can be designed for easy operation with a single hand. The quick release mechanism can include a trigger. The trigger can be pressed to release the leash from the dog's collar or harness. The trigger may comprise at least one additional trigger mechanism. In certain situations, the quick release mechanism may require activation of the trigger mechanism and at least one additional trigger mechanism. As shown in FIGS. 1 and 2, the quick release mechanism may require activation of the trigger of the trigger assembly 107 and an additional trigger mechanism 108. The quick release mechanism can allow the user to quickly and easily release the leash in situations where it is necessary to do so. The design of the one-handed leash platform with a quick-release mechanism can be such that it can provide a balance between control and freedom for the dog. Embodiments of the present leash platform can allow the user to maintain control over the dog while still giving the dog a reasonable amount of freedom to explore its surroundings. The quick-release mechanism can add an additional layer of safety, allowing the user to quickly and easily release the dog when necessary.

FIGS. 1 and 2 show the location and design of trigger assembly 107. The handle portion 103 can be designed to be comfortably gripped by the user. The handle can provide a secure grip that is resistant to slippage. The handle is an important feature as it can allow the user to maintain control of the leash. The trigger assembly can be located on the handle. The location of the trigger on the handle can allow it to be easily accessed by the user. The trigger assembly can be resistant to accidental activation, ensuring that the clip at the end of the leash is not released unintentionally. The trigger assembly can be a crucial safety feature as it prevents the dog from being unintentionally released. The trigger assembly can be made of various materials, such as plastic, metal, wood, or any other material that enables the proper operation of the trigger mechanism as described herein. The choice of material can depend on various factors, such as the desired weight, durability, and cost of the leash. The trigger assembly can also be a simple lever or a more complex mechanism, depending on the desired level of control and ease of use. In further aspects, the trigger assembly may be constructed with minimal complexity to reduce cost. The simplification of the trigger assembly may provide a robust mechanism durable enough to sustain daily use of the leash.

The cable can be responsible for transmitting the force from the trigger assembly to the clip. The cable can enable the clip to be released and reattached to the leash. The cable can be made of various materials, such as nylon, Kevlar, Dyneema, and/or steel, as described herein. The choice of material can depend on various factors, such as the desired strength, flexibility, and durability of the cable. The cable can be designed to be strong and durable, capable of withstanding the force of a dog pulling on the leash. The cable can be connected to the trigger assembly. The cable can be connected to the trigger assembly by a spring. The spring can release the cable. When the spring can release the cable, the clip at the end of the leash may also be released. This mechanism can allow for a quick and easy release and reattachment of the clip.

The collar release clip can be a vital component of the leash as it is responsible for attaching the leash to the dog's collar. The clip can ensure that the dog remains securely connected to the leash. The clip can be made of various materials, such as metal or plastic, as described in the present application. The choice of material for the clip can depend on various factors, such as the desired strength, durability, and weight of the clip. The clip can be designed to be strong enough to withstand the force of a dog pulling on the leash. The clip can be designed to be easily released and reattached via manipulation of the cable by the trigger assembly. When the trigger assembly is activated, the cable may release the clip. The clip can be reattached by pushing it back onto the collar, allowing the collar (and thus the dog) to be quickly and easily reattached to the leash. The clip can also be designed to prevent accidental release. The clip can ensure that the dog remains securely attached to the leash unless the trigger assembly has been intentionally activated.

Embodiments of the leash platform may comprise additional features, such as a light, a whistle, and/or being made of a reflective material. These additional features can enhance the functionality and safety of the leash, making it more versatile and useful in a variety of situations. The light can be used to increase visibility in low-light conditions, making it safer for the user and the dog to walk at night. The whistle can be used to signal the dog or to attract attention in case of an emergency. Both the light and the whistle can be activated by the user as needed, adding to the convenience and versatility of the leash. The leash and/or the handle can also be made of a reflective material, increasing its visibility in low-light conditions. This can enhance the safety of the user and the dog by making them more visible to motorists and other pedestrians. The reflective material can also make the leash more durable and resistant to wear and tear, extending its lifespan and making it more cost-effective in the long run. In other aspects the leash may comprise a communication device. The communication device may be configured to connect to a device associated with the dog. The communication device may be configured to allow a user of the leash to communicate with the dog through wireless communication (e.g., when the dog is off-leash). The communication device on the leash may be activated by the trigger mechanism on the leash. The communication device may be configured to relay audio information from the leash to the device associated with the dog. The communication device may enable a user to communicate with the dog when the dog would otherwise be located outside of visual and/or audible range.

FIG. 2 illustrates a detailed perspective of another embodiment of the leash system. This detailed view highlights the specific configuration of the trigger assembly that allows for immediate activation and control. The trigger assembly can be effortlessly accessed with one hand. The design provides both visual appeal and functional efficiency, helping to ensure that the leash's user can quickly and reliably engage the trigger when necessary. The location and layout of the trigger assembly are crafted to allow smooth, intuitive operation, adding to the overall usability of the one-handed dog leash system. As shown in FIG. 2, the handle can incorporate a gripping surface to allow for easier handling and control of the leash. Additionally, the handle can integrate a trigger guard to help prevent accidental release of the dog.

Figure 3:
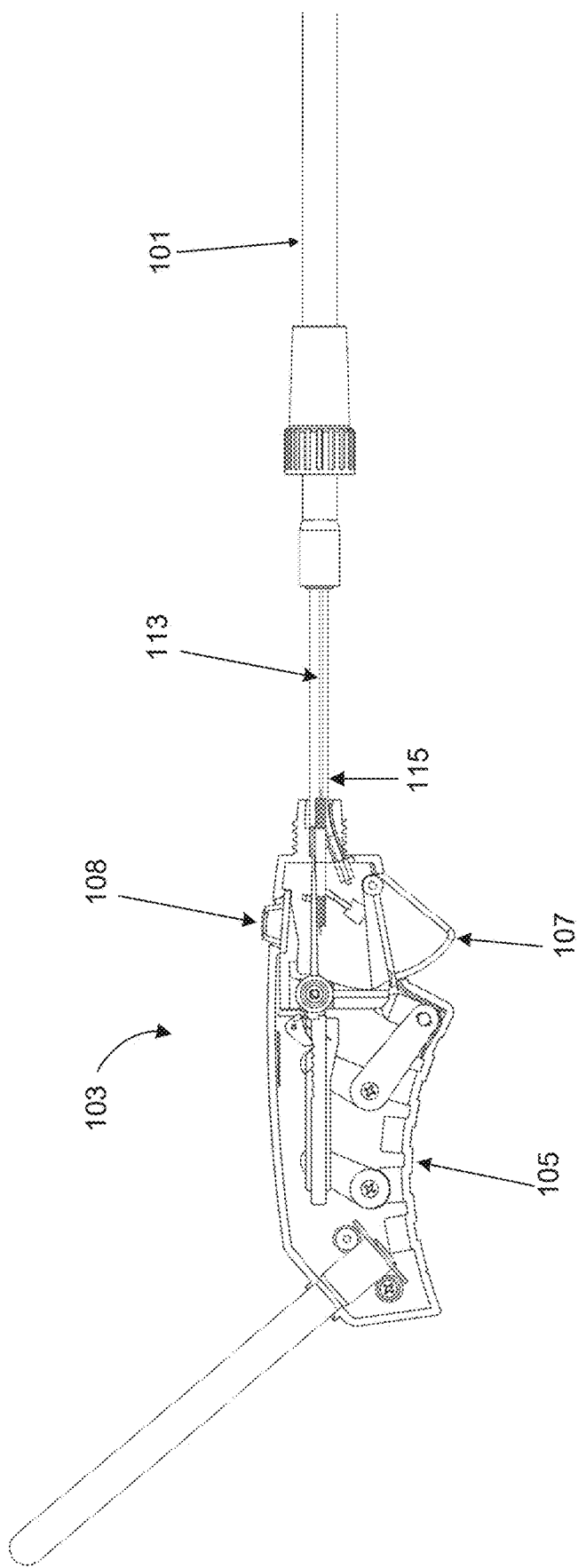
FIG. 3 is a cross-sectional view of the handle portion of the leash, showing the cable running through the interior of the leash and its connection to the trigger assembly consistent with an embodiment of the present disclosure.

FIG. 3 shows a cross-sectional view of leash body 101 and handle portion 103. As shown, the system 100 can include cable 111 which comprises a first flexible cable 113 and a second flexible cable 115. The first flexible cable may be an actuating cable 113 configured to actuate the collar attachment mechanism, and the second flexible cable may be tethering cable 115 configured to tether the handle portion with the clip or collar attachment mechanism. In some aspects, the first and second cables may be connected by a cable segment 114 to provide continuous signal transmission from the trigger assembly to the clip mechanism. The cable 111 can be made of robust and resilient materials. In embodiments, the cable 111 can run through the leash's interior, offering both structural integrity and fluid movement. The connection between the cable 111 and the trigger assembly 107 can be designed for seamless interaction, allowing for precise control over the release of the collar. In further embodiments, the leash system 100 can also conceal the mechanical elements, providing a clean and aesthetic external appearance while maintaining a highly functional and effective structure.

Figure 4:
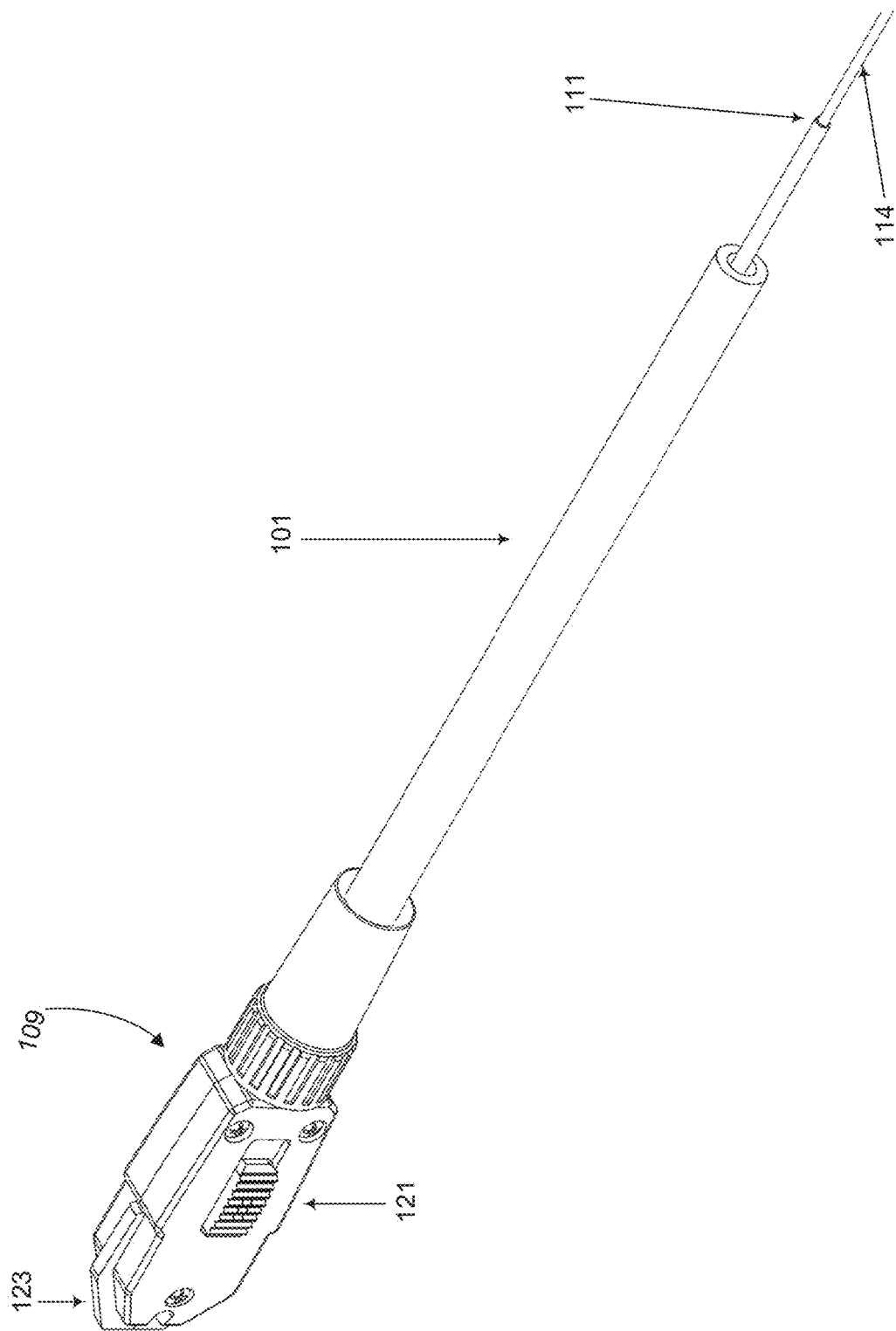
FIG. 4 is a detailed perspective view of the clip portion of the leash consistent with an embodiment of the present disclosure.
Figure 5:
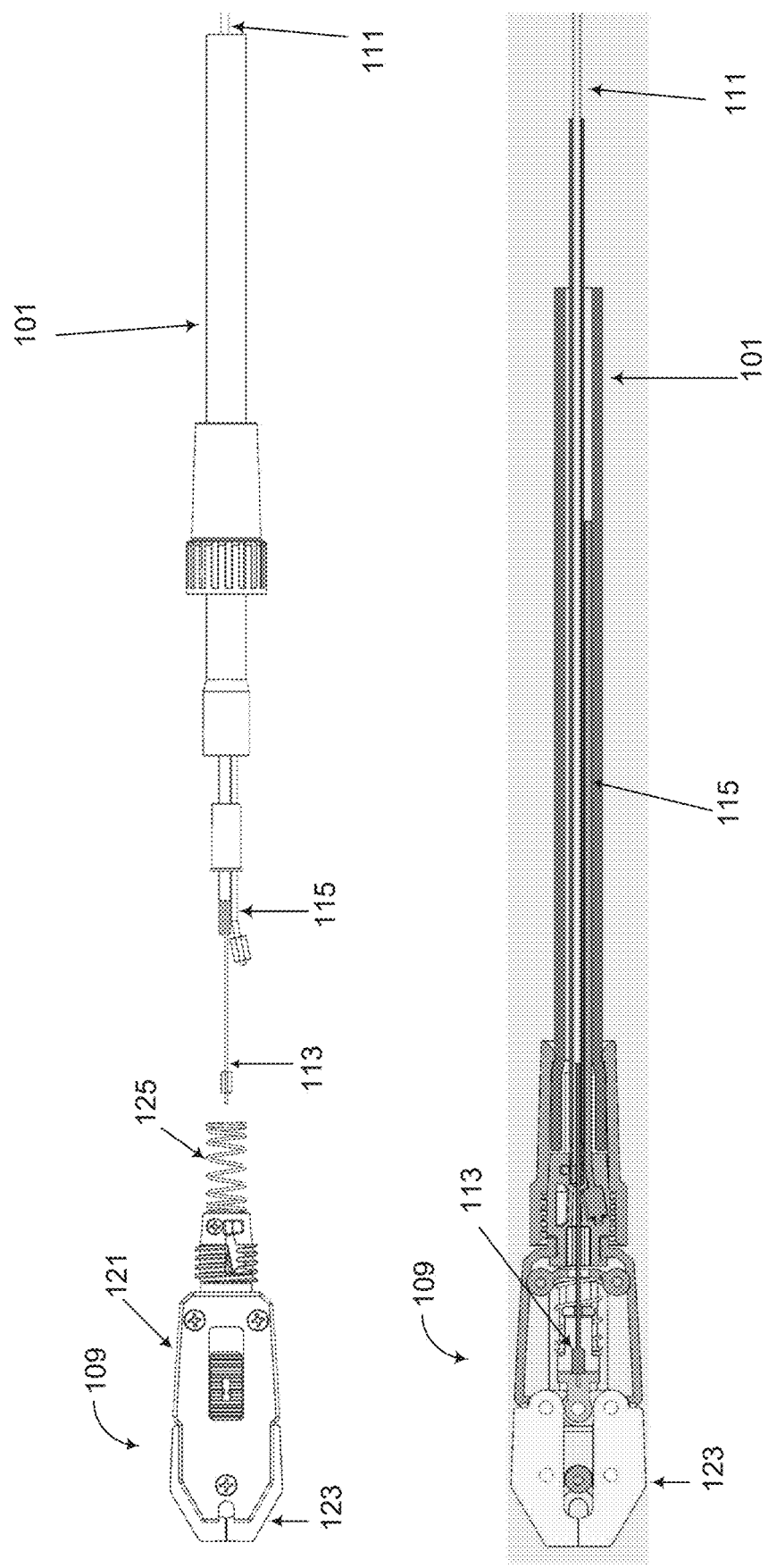
FIG. 5 is a cross-sectional view of the clip portion of the leash consistent with an embodiment of the present disclosure.

FIGS. 4-5 show a perspective and section views of clip mechanism 109 disposed at the second end of the leash body 101. As shown, clip mechanism includes a housing 121, movable jaw members 123, and a spring element 125 biasing the movable jaw member towards a closed position. The interior cable is operatively connected to the movable jaw member, and wherein actuation of the trigger assembly causes the interior cable to move the movable jaw member to an open position against the bias of the spring element. This particular embodiment showcases an ingeniously designed system that can enable the user to disconnect the collar to free the dog with a pull of the trigger mechanism. The trigger mechanism can operate on the cable to interact with the clip, which may in turn release the collar. In embodiments, a secondary trigger mechanism 108 can be actuated to allow for actuation of the trigger mechanism. This may further help to prevent accidental actuation of the trigger, and thus unintentional release of the dog. The secondary trigger mechanism 108 can be operated with the same hand that operates the trigger mechanism.

Platform Operation and Methods for Using Same

Also disclosed herein are methods of making and using the disclosed leashes, devices, apparatuses, and systems. For example, in further aspects, the techniques described herein relate to a method of operating a one-handed leash, the method including: gripping a handle of the leash with one hand; actuating a trigger assembly disposed on the handle; manipulating an interior cable extending through the leash body in response to the actuation of the trigger assembly; releasing a clip disposed at a distal end of the leash body from a collar in response to the manipulation of the interior cable; and reattaching the clip to the collar using the same hand gripping the handle.

In some aspects, the techniques described herein relate to a method, wherein actuating the trigger assembly includes depressing a lever mechanism with a thumb of the hand gripping the handle. In some aspects, the techniques described herein relate to a method, wherein actuating the trigger assembly includes pressing a button mechanism with a finger of the hand gripping the handle. In some aspects, the techniques described herein relate to a method, wherein manipulating the interior cable includes pulling the interior cable towards the handle. In some aspects, the techniques described herein relate to a method, wherein releasing the clip includes disengaging a locking mechanism of the clip. In some aspects, the techniques described herein relate to a method, wherein reattaching the clip includes aligning the clip with the dog collar and releasing the trigger assembly to allow the clip to engage with the collar.

In further aspects, the techniques described herein relate to a method of operating a one-handed quick-release leash, the method including: gripping a handle of the leash with one hand; actuating a trigger assembly disposed on the handle; transmitting a release signal through a cable disposed within the leash in response to the actuation of the trigger assembly; and disengaging a clip at a distal end of the leash from a collar in response to the release signal.

In some aspects, the techniques described herein relate to a method, further including reattaching the clip to the collar using a one-handed operation. In some aspects, the techniques described herein relate to a method, wherein actuating the trigger assembly includes manipulating a lever mechanism with a thumb of the hand gripping the handle. In some aspects, the techniques described herein relate to a method, further including maintaining control of the leash with the one hand while the clip is disengaged from the collar. In some aspects, the techniques described herein relate to a method, further including activating a safety lock to prevent unintended actuation of the trigger assembly.

In further aspects, the techniques described herein relate to a method of manufacturing a one-handed quick-release leash, the method including: forming a handle with an integrated trigger mechanism; attaching an elongated leash body to the handle; disposing a cable within the elongated leash body; operatively connecting the cable to the trigger mechanism; attaching a releasable clip to a distal end of the elongated leash body; and operatively connecting the releasable clip to the cable, such that actuation of the trigger mechanism causes the releasable clip to disengage from a collar.

In some aspects, the techniques described herein relate to a method, further including forming ergonomic contours on the handle to facilitate one-handed gripping and operation. In some aspects, the techniques described herein relate to a method, further including incorporating a safety lock mechanism into the handle to prevent unintended actuation of the trigger mechanism. In some aspects, the techniques described herein relate to a method for operating a one-handed quick-release dog leash, the method including: grasping a handle of the leash with one hand; activating a trigger assembly located on the handle; transmitting a release signal through an interior cable of the leash in response to activating the trigger assembly; and disengaging a clip at an end of the leash from a collar in response to the release signal. In some aspects, the techniques described herein relate to a method, further including: maintaining control of the leash while the clip is disengaged from the dog collar. In some aspects, the techniques described herein relate to a method, further including: aligning the clip with the collar; and securing the clip to the collar using the one hand. In some aspects, the techniques described herein relate to a method, wherein activating the trigger assembly includes pulling a lever on the handle. In some aspects, the techniques described herein relate to a method, wherein activating the trigger assembly includes pressing a button on the handle. In some aspects, the techniques described herein relate to a method, wherein transmitting the release signal through the interior cable includes manipulating a mechanical linkage within the leash. In some aspects, the techniques described herein relate to a method, wherein disengaging the clip includes opening a spring-loaded mechanism in the clip.

In further aspects, the techniques described herein relate to a method for quick release and reattachment of a dog using a one-handed leash, the method including: transitioning a dog from a leashed state to an unleashed state by: gripping a handle of the leash with one hand; activating a quick-release mechanism on the handle; and detaching a clip of the leash from a dog collar; and transitioning the dog from the unleashed state to the leashed state by: aligning the clip with the dog collar; and reattaching the clip to the dog collar using the one hand.

In some aspects, the techniques described herein relate to a method, wherein activating the quick-release mechanism includes manipulating a trigger assembly with a finger of the hand gripping the handle. In some aspects, the techniques described herein relate to a method, wherein detaching the clip includes transmitting a mechanical force through an interior cable of the leash from the quick-release mechanism to the clip. In some aspects, the techniques described herein relate to a method, wherein reattaching the clip includes manipulating a spring-loaded mechanism in the clip with the one hand. In some aspects, the techniques described herein relate to a method, further including maintaining control of the leash during both the transitioning from the leashed state to the unleashed state and the transitioning from the unleashed state to the leashed state.

In further aspects, the techniques described herein relate to a method for constructing a one-handed quick-release dog leash, the method including: forming a handle with an integrated trigger assembly; installing an interior cable system within the leash, the interior cable connecting the trigger assembly to a clip; attaching the clip to an end of the leash opposite the handle; and configuring the trigger assembly, interior cable system, and clip to enable one-handed operation for releasing and reattaching the clip to a dog collar.

In some aspects, the techniques described herein relate to a method, wherein forming the handle includes molding the handle with ergonomic finger grooves. In some aspects, the techniques described herein relate to a method, wherein installing the interior cable system includes selecting a cable material from the group consisting of nylon, Kevlar, and steel. In some aspects, the techniques described herein relate to a method, wherein attaching the clip includes selecting a clip material from the group consisting of metal and plastic. In some aspects, the techniques described herein relate to a method, further including incorporating a light into the handle of the leash. In some aspects, the techniques described herein relate to a method, further including incorporating a whistle into the handle of the leash. In some aspects, the techniques described herein relate to a method, further including constructing the leash using a reflective material.

In further aspects, the techniques described herein relate to a method for operating a quick-release dog leash system, the method including: attaching a clip of the leash to a dog collar; grasping a handle of the leash with one hand; walking a dog using the leash; and releasing the dog from the leash by activating a quick-release mechanism on the handle with the one hand.

In some aspects, the techniques described herein relate to a method, further including reattaching the clip to the dog collar using the one hand. In some aspects, the techniques described herein relate to a method, wherein activating the quick-release mechanism includes manipulating a trigger assembly with a thumb of the hand grasping the handle. In some aspects, the techniques described herein relate to a method, wherein releasing the dog from the leash includes transmitting a mechanical force through an interior cable of the leash to disengage the clip from the dog collar.

In further aspects, the techniques described herein relate to a method for using a one-handed break-away leash, the method including: gripping a handle of the leash, the handle having an ergonomic design with finger grooves; controlling a dog attached to the leash via a clip connected to a collar; activating a trigger assembly on the handle with a single finger while maintaining grip on the handle; and detaching the clip from the collar in response to activating the trigger assembly.

In some aspects, the techniques described herein relate to a method, further including reattaching the clip to the collar using the same hand gripping the handle. In some aspects, the techniques described herein relate to a method, wherein activating the trigger assembly includes pulling a lever integrated into the handle. In some aspects, the techniques described herein relate to a method, wherein detaching the clip includes transmitting a release signal through a cable running inside the leash from the trigger assembly to the clip.

In further aspects, the techniques described herein relate to a method for quick deployment of a leashed dog, the method including: holding a leash handle with one hand, the leash being attached to a dog via a collar; drawing a weapon with the other hand; activating a quick-release mechanism on the leash handle with the hand holding the handle; and releasing the dog from the leash while maintaining control of the leash with the one hand.

In some aspects, the techniques described herein relate to a method, further including recalling the dog and reattaching the leash to the dog's collar using the one hand holding the leash handle. In some aspects, the techniques described herein relate to a method, wherein activating the quick-release mechanism includes manipulating a trigger assembly integrated into the leash handle, the trigger assembly being connected to a clip via an interior cable of the leash.

In further aspects, the techniques described herein relate to a method of operating a one-handed leash system, the method including: gripping a handle of the leash system with one hand; walking a dog attached to the leash system via a clip connected to a collar; activating a trigger assembly on the handle with the same hand gripping the handle; manipulating an interior cable within the leash system via the trigger assembly activation; and releasing the clip from the dog collar in response to the interior cable manipulation.

In some aspects, the techniques described herein relate to a method, further including reattaching the clip to the collar using the same hand gripping the handle. In some aspects, the techniques described herein relate to a method, wherein activating the trigger assembly includes actuating a lever mechanism with a thumb of the hand gripping the handle. In some aspects, the techniques described herein relate to a method, further including maintaining control of the leash system with the one hand while the animal or dog is released.

In further aspects, the techniques described herein relate to a method of manufacturing a quick-release leash, the method including: forming a handle with an integrated trigger mechanism; attaching a leash portion to the handle; installing a cable system within the leash portion, the cable system operatively connected to the trigger mechanism; affixing a releasable clip to a distal end of the leash portion, the clip operatively connected to the cable system; and configuring the trigger mechanism, cable system, and releasable clip to enable one-handed operation for releasing a dog or animal from the leash.

In some aspects, the techniques described herein relate to a method, further including forming finger grooves on the handle for ergonomic gripping. In some aspects, the techniques described herein relate to a method, further including positioning the trigger mechanism for thumb activation while gripping the handle. In some aspects, the techniques described herein relate to a method, further including incorporating a spring mechanism into the releasable clip to facilitate one-handed reattachment to a collar. In some aspects, the techniques described herein relate to a method, further including selecting materials for the handle, leash portion, and cable system based on durability and weight considerations for law enforcement or military use.

In some aspects, the techniques described herein relate to a leash, apparatus, system, or method wherein the cable or cable system includes a plurality of wires. In other aspects, the techniques described herein relate to a leash, apparatus, system, or method wherein the cable or cable system includes a first wire or wire segment configured to actuate the collar attachment mechanism, and a second wire or wire segment configured to tether the handle portion with the collar attachment mechanism.

Figure 6:
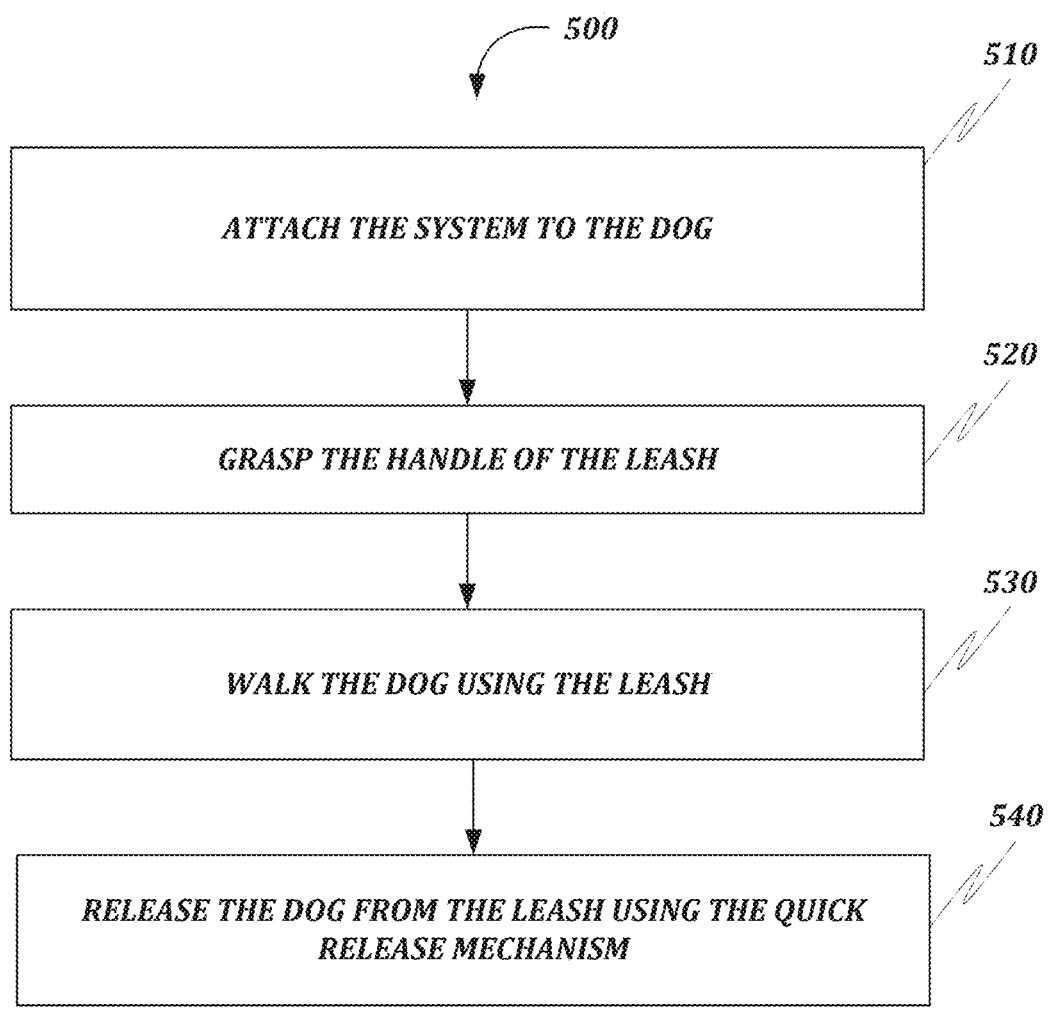
FIG. 6 is a flow chart of a method for operating the one-handed dog leash consistent with an embodiment of the present disclosure.

FIG. 6 illustrates a flow chart presenting the general stages involved in a method 500 consistent with an embodiment of the disclosure for operating the one-handed dog leash with a quick-release mechanism. Method 500 may be implemented using a one-handed dog leash as described in more detail below with respect to FIG. 5.

Although method 500 has been described to be performed by the one-handed dog leash, it should be understood that, in some embodiments, different operations may be performed by different components connected to the one-handed dog leash. For example, the quick-release mechanism may be employed in the performance of some or all of the stages in method 600. Moreover, the quick-release mechanism may be configured similarly to the one-handed dog leash and, in some instances, be one and the same embodiment.

Although the stages illustrated by the flow chart are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 500 will be described in greater detail below.

Method 500 may begin at starting block 505 and proceed to stage 510 where the one-handed dog leash may be attached to the dog's collar or harness. For example, the user may clip the leash onto the dog's collar or harness using the clip at the end of the leash.

From stage 510, where the one-handed dog leash is attached to the dog's collar or harness, method 500 may advance to stage 520 where the user may hold the handle of the leash. For example, the user may grip the handle in such a way that their fingers are positioned over the trigger of the quick-release mechanism.

Once the user has a firm grip on the handle of the leash in stage 520, method 500 may continue to stage 530 where the user may walk the dog using the leash. For example, the user may guide the dog using the leash, maintaining a comfortable distance between themselves and the dog.

After the user has walked the dog using the leash in stage 530, method 500 may proceed to stage 540 where the user may release the dog from the leash using the quick-release mechanism. For example, the user may press the trigger of the quick-release mechanism, causing the clip to release the dog's collar or harness. Once the user has released the dog from the leash in stage 540, method 500 may then end at stage 550.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The present invention includes at least the following aspects: Aspect 1. A one-handed leash system 100, comprising: a leash body 101 having a first end and a second end; a handle portion 103 disposed at the first end of the leash body, the handle portion comprising: a grip section 105 configured to be grasped by a user's hand, and a trigger assembly 107 disposed on the grip section; a clip mechanism 109 disposed at the second end of the leash body, the clip mechanism configured to releasably attach to a collar; and an interior cable 111 extending through the leash body from the trigger assembly to the clip mechanism, wherein the interior cable is configured to transmit a release signal from the trigger assembly to the clip mechanism.

Aspect 2. The one-handed leash system of aspect 1, wherein the trigger assembly comprises a lever mechanism configured to be actuated by a user's finger while grasping the grip section.

Aspect 3. The one-handed leash system of aspect 1, wherein the grip section comprises ergonomic finger grooves configured to facilitate one-handed operation of the trigger assembly.

Aspect 4. The one-handed leash system of aspect 1, wherein the clip mechanism comprises: a housing, a movable jaw member, and a spring element biasing the movable jaw member towards a closed position.

Aspect 5. The one-handed leash system of aspect 4, wherein the interior cable is operatively connected to the movable jaw member, and wherein actuation of the trigger assembly causes the interior cable to move the movable jaw member to an open position against the bias of the spring element.

Aspect 6. The one-handed leash system of aspect 1, wherein the interior cable comprises a first cable segment and a second cable segment, the first and second cable segments being operatively connected to provide continuous signal transmission from the trigger assembly to the clip mechanism.

Aspect 7. The one-handed leash system of aspect 1, further comprising a quick-reattachment mechanism configured to facilitate one-handed reattachment of the clip mechanism to a dog collar.

Aspect 8. The one-handed leash system of aspect 7, wherein the quick-reattachment mechanism comprises a magnetic element disposed on the clip mechanism to assist in aligning and securing the clip mechanism to a complementary element on the dog collar.

Aspect 9. The one-handed leash system of aspect 1, wherein the leash body is fabricated from a reflective material to enhance visibility in low-light conditions.

Aspect 10. The one-handed leash system of aspect 1, further comprising an integrated light source disposed on the handle portion to illuminate the path ahead during use.

Aspect 11. A one-handed leash apparatus, comprising: a handle configured for gripping with one hand; an elongated leash body extending from the handle; a trigger assembly disposed on the handle; a cable disposed within the elongated leash body and operatively connected to the trigger assembly; and a clip disposed at a distal end of the elongated leash body opposite the handle, the clip being operatively connected to the cable and configured to selectively release and reattach to a dog collar in response to actuation of the trigger assembly.

Aspect 12. The one-handed leash apparatus of aspect 11, wherein the trigger assembly comprises a lever mechanism.

Aspect 13. The one-handed leash apparatus of aspect 11, wherein the trigger assembly comprises a button mechanism.

Aspect 14. The one-handed leash apparatus of aspect 11, wherein the handle comprises ergonomic contours configured to fit a user's hand.

Aspect 15. The one-handed leash apparatus of aspect 14, wherein the ergonomic contours comprise finger grooves.

Aspect 16. The one-handed leash apparatus of aspect 11, wherein the trigger assembly is positioned for actuation by a user's thumb when gripping the handle.

Aspect 17. The one-handed leash apparatus of aspect 11, wherein the cable comprises a material selected from the group consisting of nylon, Kevlar, and steel.

Aspect 18. The one-handed leash apparatus of aspect 11, wherein the clip comprises a spring-loaded mechanism configured to facilitate quick reattachment to a dog collar.

Aspect 19. The one-handed leash apparatus of aspect 11, further comprising a safety lock mechanism configured to prevent unintended actuation of the trigger assembly.

Aspect 20. A quick-release leash system, comprising: a handle portion configured for one-handed operation; a leash portion extending from the handle portion; a release mechanism integrated within the handle portion; a transmission element disposed within the leash portion and operatively connected to the release mechanism; and a collar attachment device disposed at a distal end of the leash portion, the collar attachment device being configured to selectively engage and disengage from a collar in response to actuation of the release mechanism.

Aspect 21. The quick-release dog leash system of aspect 20, wherein the release mechanism comprises a trigger assembly positioned for actuation by a user's finger or thumb.

Aspect 22. The quick-release dog leash system of aspect 10, wherein the transmission element comprises a flexible cable.

Aspect 23. The quick-release dog leash system of aspect 10, wherein the collar attachment device comprises a spring-loaded clip.

Aspect 24. The quick-release dog leash system of aspect 10, wherein the handle portion comprises an ergonomic design configured to facilitate one-handed control of the leash and actuation of the release mechanism.

Aspect 25. The quick-release dog leash system of aspect 10, further comprising a reattachment mechanism configured to facilitate one-handed reattachment of the collar attachment device to a dog collar.

Aspect 26. A leash apparatus with one-handed quick-release functionality, comprising: a grip portion configured for one-handed holding; an elongated flexible member extending from the grip portion; a release actuator integrated within the grip portion; a force transmission member disposed within the elongated flexible member and operatively connected to the release actuator; and a collar coupling element disposed at a distal end of the elongated flexible member, the collar coupling element being configured to selectively attach to and detach from a collar in response to manipulation of the release actuator.

Aspect 27. The leash apparatus of aspect 26, wherein the release actuator comprises a trigger mechanism positioned for actuation by a user's thumb or finger while gripping the grip portion.

Aspect 28. The leash apparatus of aspect 26, wherein the force transmission member comprises a tensile element selected from the group consisting of a cable, a wire, and a cord.

Aspect 29. The leash apparatus of aspect 26, wherein the collar coupling element comprises a biased clip mechanism configured for rapid reattachment to a collar.

Aspect 30. The leash apparatus of aspect 26, further comprising a locking mechanism configured to selectively prevent actuation of the release actuator.

Aspect 31. The leash apparatus of aspect 26, wherein the grip portion comprises ergonomic features configured to enhance one-handed control and operation.

Aspect 32. The leash apparatus of aspect 26, wherein the collar coupling element is configured to automatically reattach to a dog collar upon alignment with the dog collar.

Aspect 33. The leash apparatus of aspect 26, further comprising a tethering member disposed within the elongated flexible member and configured to tether the grip portion and the collar coupling element.

Aspect 34. A one-handed leash system, comprising: a handle configured for gripping with one hand; a leash portion extending from the handle; a clip at a distal end of the leash portion, the clip configured to attach to a dog collar; a trigger assembly disposed on the handle; an interior cable system extending through the leash portion and operatively connecting the trigger assembly to the clip; and wherein activation of the trigger assembly manipulates the interior cable system to release the clip from the dog collar.

Aspect 35. The one-handed leash system of aspect 34, wherein the trigger assembly comprises a lever mechanism.

Aspect 36. The one-handed leash system of aspect 34, wherein the trigger assembly is positioned for actuation by a thumb of a user while gripping the handle.

Aspect 37. The one-handed leash system of aspect 34, wherein the handle comprises finger grooves configured to ergonomically fit a user's hand.

Aspect 38. The one-handed leash system of aspect 34, wherein the clip is configured for quick reattachment to the collar after release.

Aspect 39. The one-handed leash system of aspect 34, wherein the interior cable comprises a material selected from the group consisting of nylon, Kevlar, and steel.

Aspect 40. The one-handed leash system of aspect 34, wherein the clip comprises a spring-loaded mechanism for facilitating reattachment to the dog collar.

Aspect 41. The one-handed leash system of aspect 34, wherein the handle is formed of a material selected from the group consisting of plastic, metal, and wood.

Aspect 42. The one-handed leash system of aspect 34, further comprising a light integrated into the handle.

Aspect 43. The one-handed leash system of aspect 34, wherein the leash portion comprises a reflective material.

Aspect 44. A quick-release leash apparatus, comprising: an ergonomic handle having finger grooves; a leash portion extending from the handle; a quick-release mechanism integrated into the handle; a clip at a distal end of the leash portion; and a cable system operatively connecting the quick-release mechanism to the clip; wherein actuation of the quick-release mechanism causes the clip to disengage from a dog collar.

Aspect 45. The quick-release leash apparatus of aspect 44, wherein the quick-release mechanism comprises a thumb-actuated trigger.

Aspect 46. The quick-release leash apparatus of aspect 44, wherein the cable system comprises a continuous cable extending from the quick-release mechanism to the clip.

Aspect 47. The quick-release leash apparatus of aspect 44, wherein the cable system comprises two separate cables operatively connected to transmit force from the quick-release mechanism to the clip.

Aspect 48. The quick-release leash apparatus of aspect 44, wherein the clip comprises a spring-loaded latch configured for one-handed reattachment to the dog collar.

Aspect 49. The quick-release leash apparatus of aspect 44, wherein the handle is configured to fit naturally in a user's hand for single-handed operation of both the leash and the quick-release mechanism.

Aspect 50. A leash release system, comprising: a leash body having a proximal end and a distal end; a grip portion at the proximal end of the leash body; a release actuator integrated into the grip portion; a collar attachment mechanism at the distal end of the leash body; and a force transmission element extending through the leash body and operatively connecting the release actuator to the collar attachment mechanism; wherein activation of the release actuator causes the collar attachment mechanism to detach from a collar.

Aspect 51. The leash release system of aspect 50, wherein the release actuator is positioned for operation by a thumb of a user while gripping the grip portion.

Aspect 52. The leash release system of aspect 50, wherein the force transmission element comprises a cable selected from the group consisting of a metal cable, a polymer cable, and a composite fiber cable.

Aspect 53. The leash release system of aspect 50, wherein the collar attachment mechanism comprises a spring-biased clip configured for rapid reattachment to the dog collar.

Aspect 54. The leash release system of aspect 50, wherein the grip portion comprises ergonomic contours designed for single-handed control of the leash and operation of the release actuator.

Aspect 55. A one-handed leash apparatus, comprising: a handle configured for gripping with one hand; an elongated leash body extending from the handle; a trigger assembly disposed on the handle; an interior cable system extending through the leash body and operatively connected to the trigger assembly; and a clip disposed at a distal end of the leash body opposite the handle, the clip configured to selectively release from and reattach to a dog collar in response to manipulation of the trigger assembly.

Aspect 56. The one-handed leash apparatus of aspect 55, wherein the trigger assembly comprises a lever mechanism.

Aspect 57. The one-handed leash apparatus of aspect 55, wherein the trigger assembly comprises a button mechanism.

Aspect 58. The one-handed leash apparatus of aspect 55, wherein the handle comprises ergonomic finger grooves.

Aspect 59. The one-handed leash apparatus of aspect 55, wherein the trigger assembly is positioned for actuation by a user's thumb when gripping the handle.

Aspect 60. The one-handed leash apparatus of aspect 55, wherein the interior cable comprises a continuous cable extending from the trigger assembly to the clip.

Aspect 61. The one-handed leash apparatus of aspect 55, wherein the interior cable comprises a first cable segment and a second cable segment operatively connected within the leash body.

Aspect 62. The one-handed leash apparatus of aspect 55, wherein the clip comprises a spring-loaded mechanism configured to bias the clip towards a closed position.

Aspect 63. The one-handed leash apparatus of aspect 55, wherein the clip comprises a locking mechanism configured to secure the clip in a closed position until released by actuation of the trigger assembly.

Aspect 64. The one-handed leash apparatus of aspect 55, wherein the leash body comprises a flexible material selected from the group consisting of nylon, leather, and synthetic fabric.

Aspect 65. The one-handed leash apparatus of aspect 55, wherein the interior cable comprises a material selected from the group consisting of nylon, Kevlar, and steel.

Aspect 66. The one-handed leash apparatus of aspect 55, wherein the clip comprises a material selected from the group consisting of metal and high-strength plastic.

Aspect 67. The one-handed leash apparatus of aspect 55, further comprising a light source integrated into the handle.

Aspect 68. The one-handed leash apparatus of aspect 55, further comprising a whistle integrated into the handle.

Aspect 69. The one-handed leash apparatus of aspect 55, wherein the leash body comprises a reflective material.

Aspect 70. A quick-release leash system, comprising: a handle portion configured for one-handed operation; an elongated leash portion extending from the handle portion; a release mechanism integrated into the handle portion; a cable system extending through the leash portion and operatively connected to the release mechanism; and a collar attachment mechanism disposed at a distal end of the leash portion, the collar attachment mechanism configured to selectively engage with and disengage from a dog collar in response to actuation of the release mechanism.

Aspect 71. The quick-release leash system of aspect 70, wherein the release mechanism comprises a thumb-actuated trigger.

Aspect 72. The quick-release leash system of aspect 70, wherein the cable system comprises a tension-responsive mechanism configured to transmit force from the release mechanism to the collar attachment mechanism.

Aspect 73. The quick-release leash system of aspect 70, wherein the collar attachment mechanism comprises a spring-loaded clip.

Aspect 74. The quick-release leash system of aspect 70, wherein the handle portion comprises ergonomic contours configured to facilitate secure gripping and trigger actuation with a single hand.

Aspect 75. The quick-release leash system of aspect 70, further comprising a reattachment feature configured to allow one-handed reconnection of the collar attachment mechanism to the dog collar.

Aspect 76. The quick-release leash system of aspect 70, wherein the leash portion comprises a flexible, durable material resistant to tangling.

Aspect 77. The quick-release leash system of aspect 70, wherein the cable system is configured to operate smoothly within the leash portion to minimize friction during actuation.

Aspect 78. The quick-release leash system of aspect 70, wherein the collar attachment mechanism is configured to provide audible feedback upon successful engagement with or disengagement from the dog collar.

Aspect 79. A method of operating a one-handed leash, the method comprising: gripping a handle of the leash with one hand; actuating a trigger assembly disposed on the handle; manipulating an interior cable extending through the leash body in response to the actuation of the trigger assembly; releasing a clip disposed at a distal end of the leash body from a collar in response to the manipulation of the interior cable; and reattaching the clip to the collar using the same hand gripping the handle.

Aspect 80. The method of aspect 79, wherein actuating the trigger assembly comprises depressing a lever mechanism with a thumb of the hand gripping the handle.

Aspect 81. The method of aspect 79, wherein actuating the trigger assembly comprises pressing a button mechanism with a finger of the hand gripping the handle.

Aspect 82. The method of aspect 79, wherein manipulating the interior cable comprises pulling the interior cable towards the handle.

Aspect 83. The method of aspect 79, wherein releasing the clip comprises disengaging a locking mechanism of the clip.

Aspect 84. The method of aspect 79, wherein reattaching the clip comprises aligning the clip with the dog collar and releasing the trigger assembly to allow the clip to engage with the collar.

Aspect 85. A method of operating a one-handed quick-release leash, the method comprising: gripping a handle of the leash with one hand; actuating a trigger assembly disposed on the handle; transmitting a release signal through a cable disposed within the leash in response to the actuation of the trigger assembly; and disengaging a clip at a distal end of the leash from a collar in response to the release signal.

Aspect 86. The method of aspect 85, further comprising reattaching the clip to the collar using a one-handed operation.

Aspect 87. The method of aspect 85, wherein actuating the trigger assembly comprises manipulating a lever mechanism with a thumb of the hand gripping the handle.

Aspect 88. The method of aspect 85, further comprising maintaining control of the leash with the one hand while the clip is disengaged from the collar.

Aspect 89. The method of aspect 85, further comprising activating a safety lock to prevent unintended actuation of the trigger assembly.

Aspect 90. A method of manufacturing a one-handed quick-release leash, the method comprising: forming a handle with an integrated trigger mechanism; attaching an elongated leash body to the handle; disposing a cable within the elongated leash body; operatively connecting the cable to the trigger mechanism; attaching a releasable clip to a distal end of the elongated leash body; and operatively connecting the releasable clip to the cable, such that actuation of the trigger mechanism causes the releasable clip to disengage from a collar.

Aspect 91. The method of aspect 90, further comprising forming ergonomic contours on the handle to facilitate one-handed gripping and operation.

Aspect 92. The method of aspect 90, further comprising incorporating a safety lock mechanism into the handle to prevent unintended actuation of the trigger mechanism.

Aspect 93. A method for operating a one-handed quick-release dog leash, the method comprising: grasping a handle of the leash with one hand; activating a trigger assembly located on the handle; transmitting a release signal through an interior cable of the leash in response to activating the trigger assembly; and disengaging a clip at an end of the leash from a collar in response to the release signal.

Aspect 94. The method of aspect 93, further comprising: maintaining control of the leash while the clip is disengaged from the dog collar.

Aspect 95. The method of aspect 93, further comprising: aligning the clip with the collar; and securing the clip to the collar using the one hand.

Aspect 96. The method of aspect 93, wherein activating the trigger assembly comprises pulling a lever on the handle.

Aspect 97. The method of aspect 93, wherein activating the trigger assembly comprises pressing a button on the handle.

Aspect 98. The method of aspect 93, wherein transmitting the release signal through the interior cable comprises manipulating a mechanical linkage within the leash.

Aspect 99. The method of aspect 93, wherein disengaging the clip comprises opening a spring-loaded mechanism in the clip.

Aspect 100. A method for quick release and reattachment of a dog using a one-handed leash, the method comprising: transitioning a dog from a leashed state to an unleashed state by: gripping a handle of the leash with one hand; activating a quick-release mechanism on the handle; and detaching a clip of the leash from a dog collar; and transitioning the dog from the unleashed state to the leashed state by: aligning the clip with the dog collar; and reattaching the clip to the dog collar using the one hand.

Aspect 101. The method of aspect 100, wherein activating the quick-release mechanism comprises manipulating a trigger assembly with a finger of the hand gripping the handle.

Aspect 102. The method of aspect 100, wherein detaching the clip comprises transmitting a mechanical force through an interior cable of the leash from the quick-release mechanism to the clip.

Aspect 103. The method of aspect 100, wherein reattaching the clip comprises manipulating a spring-loaded mechanism in the clip with the one hand.

Aspect 104. The method of aspect 100, further comprising maintaining control of the leash during both the transitioning from the leashed state to the unleashed state and the transitioning from the unleashed state to the leashed state.

Aspect 105. A method for constructing a one-handed quick-release dog leash, the method comprising: forming a handle with an integrated trigger assembly; installing an interior cable system within the leash, the interior cable connecting the trigger assembly to a clip; attaching the clip to an end of the leash opposite the handle; and configuring the trigger assembly, interior cable system, and clip to enable one-handed operation for releasing and reattaching the clip to a dog collar.

Aspect 106. The method of aspect 105, wherein forming the handle comprises molding the handle with ergonomic finger grooves.

Aspect 107. The method of aspect 105, wherein installing the interior cable system comprises selecting a cable material from the group consisting of nylon, Kevlar, and steel.

Aspect 108. The method of aspect 105, wherein attaching the clip comprises selecting a clip material from the group consisting of metal and plastic.

Aspect 109. The method of aspect 105, further comprising incorporating a light into the handle of the leash.

Aspect 110. The method of aspect 105, further comprising incorporating a whistle into the handle of the leash.

Aspect 111. The method of aspect 105, further comprising constructing the leash using a reflective material.

Aspect 112. A method for operating a quick-release dog leash system, the method comprising: attaching a clip of the leash to a dog collar; grasping a handle of the leash with one hand; walking a dog using the leash; and releasing the dog from the leash by activating a quick-release mechanism on the handle with the one hand.

Aspect 113. The method of aspect 112, further comprising reattaching the clip to the dog collar using the one hand.

Aspect 114. The method of aspect 112, wherein activating the quick-release mechanism comprises manipulating a trigger assembly with a thumb of the hand grasping the handle.

Aspect 115. The method of aspect 112, wherein releasing the dog from the leash comprises transmitting a mechanical force through an interior cable of the leash to disengage the clip from the dog collar.

Aspect 116. A method for using a one-handed break-away leash, the method comprising: gripping a handle of the leash, the handle having an ergonomic design with finger grooves; controlling a dog attached to the leash via a clip connected to a collar; activating a trigger assembly on the handle with a single finger while maintaining grip on the handle; and detaching the clip from the collar in response to activating the trigger assembly.

Aspect 117. The method of aspect 116, further comprising reattaching the clip to the collar using the same hand gripping the handle.

Aspect 118. The method of aspect 116, wherein activating the trigger assembly comprises pulling a lever integrated into the handle.

Aspect 119. The method of aspect 116, wherein detaching the clip comprises transmitting a release signal through a cable running inside the leash from the trigger assembly to the clip.

Aspect 120. A method for quick deployment of a leashed dog, the method comprising: holding a leash handle with one hand, the leash being attached to a dog via a collar;

drawing a weapon with the other hand; activating a quick-release mechanism on the leash handle with the hand holding the handle; and releasing the dog from the leash while maintaining control of the leash with the one hand.

Aspect 121. The method of aspect 120, further comprising recalling the dog and reattaching the leash to the dog's collar using the one hand holding the leash handle.

Aspect 122. The method of aspect 120, wherein activating the quick-release mechanism comprises manipulating a trigger assembly integrated into the leash handle, the trigger assembly being connected to a clip via an interior cable of the leash.

Aspect 123. A method of operating a one-handed leash system, the method comprising: gripping a handle of the leash system with one hand; walking a dog attached to the leash system via a clip connected to a collar; activating a trigger assembly on the handle with the same hand gripping the handle; manipulating an interior cable within the leash system via the trigger assembly activation; and releasing the clip from the dog collar in response to the interior cable manipulation.

Aspect 124. The method of aspect 123, further comprising reattaching the clip to the collar using the same hand gripping the handle.

Aspect 125. The method of aspect 123, wherein activating the trigger assembly comprises actuating a lever mechanism with a thumb of the hand gripping the handle.

Aspect 126. The method of aspect 123, further comprising maintaining control of the leash system with the one hand while the animal or dog is released.

Aspect 127. A method of manufacturing a quick-release leash, the method comprising: forming a handle with an integrated trigger mechanism; attaching a leash portion to the handle; installing a cable system within the leash portion, the cable system operatively connected to the trigger mechanism; affixing a releasable clip to a distal end of the leash portion, the clip operatively connected to the cable system; and configuring the trigger mechanism, cable system, and releasable clip to enable one-handed operation for releasing a dog or animal from the leash.

Aspect 128. The method of aspect 127, further comprising forming finger grooves on the handle for ergonomic gripping.

Aspect 129. The method of aspect 127, further comprising positioning the trigger mechanism for thumb activation while gripping the handle.

Aspect 130. The method of aspect 127, further comprising incorporating a spring mechanism into the releasable clip to facilitate one-handed reattachment to a collar.

Aspect 131. The method of aspect 127, further comprising selecting materials for the handle, leash portion, and cable system based on durability and weight considerations for law enforcement or military use.

Aspect 132. The leash, apparatus, system, or method of any preceding aspect wherein the cable or cable system comprises a plurality of wires.

Aspect 133. The leash, apparatus, system, or method of any preceding aspect wherein the cable or cable system comprises a first wire configured to actuate the collar attachment mechanism, and a second wire configured to tether the handle portion with the collar attachment mechanism.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following is claimed:

1. A one-handed leash system, comprising:
   a leash body having a first end and a second end;
   a handle portion disposed at the first end of the leash body, the handle portion comprising:
      a grip section configured to be grasped by a user's hand, and
      a trigger assembly disposed on the grip section;
   a spring-loaded clip mechanism disposed at the second end of the leash body, the clip mechanism configured to releasably attach to a collar; and
   an interior cable extending through the leash body from the trigger assembly to the clip mechanism, wherein the interior cable is configured to transmit a release signal from the trigger assembly to the clip mechanism, the interior cable comprising a first flexible cable configured to transmit the release signal to the clip mechanism and a second flexible cable configured to tether the handle portion to the clip mechanism; and wherein the second flexible cable is not operatively involved in engaging and disengaging the clip mechanism when actuating the clip mechanism.

2. The one-handed leash system of claim 1, wherein the trigger assembly comprises a lever mechanism configured to be actuated by a user's finger while grasping the grip section.

3. The one-handed leash system of claim 1, wherein the grip section comprises ergonomic finger grooves configured to facilitate one-handed operation of the trigger assembly.

4. The one-handed leash system of claim 1, wherein the spring-loaded clip mechanism comprises:
   a housing,
   a movable jaw member, and
   a spring element biasing the movable jaw member towards a closed position.

5. The one-handed leash system of claim 4, wherein the first flexible cable of the interior cable is operatively connected to the movable jaw member, and wherein actuation of the trigger assembly causes the first flexible cable of the interior cable to move the movable jaw member to an open position against the bias of the spring element.

6. The one-handed leash system of claim 1, wherein the interior cable comprises a first cable segment and a second cable segment, the first and second cable segments being operatively connected to provide continuous signal transmission from the trigger assembly to the clip mechanism.

7. The one-handed leash system of claim 1, further comprising a quick-reattachment mechanism configured to facilitate one-handed reattachment of the clip mechanism to a dog collar.

8. A leash system, comprising:
   a handle portion configured for one-handed operation;
   a leash portion extending from the handle portion;
   a release mechanism integrated within the handle portion;
   a collar attachment device disposed at a distal end of the leash portion, the collar attachment device comprising a spring-loaded clip configured to selectively engage and disengage in response to actuation of the release mechanism; and
   a transmission element disposed within the leash portion and operatively connected to the release mechanism, wherein the transmission element comprises a first flexible cable configured to actuate the release mechanism and a second flexible cable configured to tether the handle portion to the collar attachment device; and wherein the second flexible cable is not operatively involved in engaging and disengaging the collar attachment device when actuating the release mechanism.

9. The leash system of claim 8, wherein the release mechanism comprises a trigger assembly positioned for actuation by a user's finger or thumb.

10. The leash system of claim 8, wherein the handle portion comprises an ergonomic design configured to facilitate one-handed control of the leash and actuation of the release mechanism.

11. The leash system of claim 10, further comprising a reattachment mechanism configured to facilitate one-handed reattachment of the collar attachment device.

12. A leash apparatus with one-handed quick-release functionality, comprising:
   a grip portion configured for one-handed holding;
   an elongated flexible member extending from the grip portion;
   a release actuator integrated within the grip portion;
   a collar coupling element disposed at a distal end of the elongated flexible member, the collar coupling element comprising a spring-loaded clip configured to selectively engage to and disengage in response to manipulation of the release actuator; and
   a force transmission member and a tethering member disposed within the elongated flexible member, wherein the force transmission member is operatively connected to the release actuator, and wherein the tethering member is configured to tether the grip portion to the collar coupling element; and wherein the tethering member is not operatively involved in actuation of the release actuator.

13. The leash apparatus of claim 12, wherein the release actuator comprises a trigger mechanism positioned for actuation by a user's thumb or finger while gripping the grip portion.

14. The leash apparatus of claim 13, wherein the force transmission member and the tethering member comprise separate tensile elements selected from the group consisting of a cable, a wire, and a cord.

15. The one-handed leash system of claim 1, wherein the clip mechanism is configured to automatically close upon making contact with a connection point.

16. The leash system of claim 8, wherein the collar attachment device is configured to automatically close upon making contact with a connection point.

17. The leash system of claim 8, wherein the leash portion comprises a reflective material to enhance visibility in low-light conditions.

18. The leash apparatus of claim 12, wherein the collar coupling element is configured to automatically close upon making contact with a connection point.

19. The leash apparatus of claim 12, wherein the elongated flexible member comprises a reflective material to enhance visibility in low-light conditions.

* * * * *